United States Patent
Klemmack

(10) Patent No.: US 11,548,729 B1
(45) Date of Patent: Jan. 10, 2023

(54) RECYCLING SYSTEM WITH DISCRETE CONVEYOR BINS FOR IMPROVED ACCURACY

(71) Applicant: Oregon Beverage Recycling Cooperative, Clackamas, OR (US)

(72) Inventor: Johann Klemmack, Virginia Beach, VA (US)

(73) Assignee: Oregon Beverage Recycling Cooperative, Clackamas, OR (US)

( * ) Notice: Subject to any disclaimer, the term of this patent is extended or adjusted under 35 U.S.C. 154(b) by 0 days.

(21) Appl. No.: 17/665,290

(22) Filed: Feb. 4, 2022

Related U.S. Application Data

(60) Provisional application No. 63/203,657, filed on Jul. 27, 2021.

(51) Int. Cl.
*B65F 1/14* (2006.01)
*B65F 1/00* (2006.01)
*G06T 7/70* (2017.01)

(52) U.S. Cl.
CPC ............ *B65F 1/1484* (2013.01); *B65F 1/006* (2013.01); *G06T 7/70* (2017.01); *B65F 2210/1123* (2013.01); *B65F 2210/124* (2013.01); *B65F 2210/138* (2013.01); *B65F 2210/139* (2013.01); *B65F 2210/176* (2013.01); *B65F 2210/182* (2013.01)

(58) Field of Classification Search
CPC . G06T 7/00; G06T 7/0002; G06T 1/00; B65F 1/00; B65F 2210/112; B65F 2210/1123
USPC .......................................................... 209/3
See application file for complete search history.

(56) References Cited

U.S. PATENT DOCUMENTS

| | | | | |
|---|---|---|---|---|
| 5,339,607 A * | 8/1994 | Regier | .................... | B65B 57/20 53/240 |
| 6,189,702 B1 * | 2/2001 | Bonnet | .................. | B65G 47/82 198/748 |
| 10,538,394 B2 * | 1/2020 | Wagner | .................. | B65G 47/82 |
| 10,792,706 B2 * | 10/2020 | Wagner | .................. | B65B 35/06 |
| 11,055,504 B2 * | 7/2021 | Wagner | .............. | G06K 7/10693 |

(Continued)

FOREIGN PATENT DOCUMENTS

| CA | 3060257 A1 * | 10/2018 | ........... B07C 5/3412 |
|---|---|---|---|
| CN | 112827865 A * | 5/2021 | ............... B07C 5/00 |

(Continued)

*Primary Examiner* — Terrell H Matthews
(74) *Attorney, Agent, or Firm* — Klarquist Sparkman, LLP

(57) ABSTRACT

Recycling systems can include a conveyor system, an optical device, and a processor operable to detect, identify, and count redeemable objects. The conveyor system can include a plurality of bins and be configured to move the bins from a first end of the conveyor system to a second end of the conveyor system. The optical device can be situated and configured to capture an image of a plurality of objects within a bin of the conveyor system. A processor including computer-readable instructions can be configured to detect and identify the objects within an image captured by the optical device as belonging to one or more object classes. Each object class can determine whether an object is redeemable or unredeemable. The processor can be configured to provide a count of only those objects identified as redeemable.

20 Claims, 8 Drawing Sheets

(56) References Cited

U.S. PATENT DOCUMENTS

| | | | | |
|---|---|---|---|---|
| 2002/0170850 A1* | 11/2002 | Bonham | ............... | B65G 47/44 |
| | | | | 209/589 |
| 2012/0209783 A1* | 8/2012 | Smith, Jr. | ............ | G06Q 20/384 |
| | | | | 705/308 |
| 2014/0360924 A1* | 12/2014 | Smith | .................... | B07C 5/362 |
| | | | | 209/552 |
| 2015/0212023 A1* | 7/2015 | Balthasar | ............... | G01N 27/00 |
| | | | | 209/567 |
| 2016/0023248 A1* | 1/2016 | Afsari | ................... | G01N 21/85 |
| | | | | 356/601 |
| 2017/0232449 A1* | 8/2017 | Donald | ................ | B03C 1/0332 |
| | | | | 209/219 |
| 2021/0276799 A1* | 9/2021 | Velagapudi | .......... | B65G 1/0435 |

FOREIGN PATENT DOCUMENTS

| | | | | |
|---|---|---|---|---|
| CN | 111717561 B * | 6/2021 | ........... | B65F 1/0053 |
| EP | 0915035 A1 * | 5/1999 | | |
| WO | WO-2009021515 A1 * | 2/2009 | ............. | B07C 5/126 |

* cited by examiner

RECYCLING SYSTEM WITH DISCRETE CONVEYOR BINS FOR IMPROVED ACCURACY

CROSS REFERENCE TO RELATED APPLICATION

This application claims priority to U.S. Provisional Patent Application No. 63/203,657, filed Jul. 27, 2021, which is incorporated herein by reference in its entirety.

FIELD

This disclosure relates to recycling systems, and more particularly, relates to automated identification and counting of redeemable recyclables.

BACKGROUND

As a way to incentivize proper disposal of certain products, some deposit-refund programs require payment of a refundable deposit on those products at the time of purchase. These deposits are typically refunded in full upon return of the product or the product's packaging. Such products can include recyclables and reusables. Existing systems and methods used to process these product returns, however, are limited by time consuming, laborious and often, inaccurate approaches. Accordingly, a need remains for new approaches to quickly and accurately process these products and the associated refunds.

SUMMARY

In one representative embodiment, a recycling system is provided. The recycling system can include a conveyor system having a plurality of bins, the conveyor system being configured to move the bins from a first end of the conveyor system to a second end of the conveyor system. The recycling system can also include an optical device situated and configured to capture an image of a plurality of objects within a bin of the conveyor system and a processor including computer-readable instructions. By executing the instructions, the processor can be configured to detect and identify the objects within an image captured by the optical device as belonging to one or more object classes, wherein the object classes determine whether an object is redeemable or unredeemable, and provide a count of only those objects identified as redeemable.

In some embodiments, by executing the instructions, the processor can be further configured to detect and identify a first bin, wherein only objects within the first bin are counted. In further embodiments, by executing the instructions, the processor can be further configured to predict whether two or more objects identified as redeemable have overlapping centers, wherein only one of the two or more objects having overlapping centers is counted. In still further embodiments, by executing the instructions, the processor can be further configured to determine a confidence score for each object, wherein only those objects meeting a threshold confidence score are counted.

In some embodiments, the one or more object classes can include a material, a volume, a livery, a brand, a geographic region, and/or a distributor of the object. In further such embodiments, the objects can be used beverage containers. In some embodiments, the recycling system can further include an enclosure extending over the optical device and the objects, the enclosure having a light source configured to illuminate the objects. In such embodiments, the recycling system can further include a light diffuser configured to diffuse the illumination from the light source over the objects.

In another representative embodiment, a method is provided. The method can include capturing an image of a batch of objects within a bin of a conveyor system, detecting and identifying the objects within the image as belonging to one or more object classes, determining whether each object within the batch is a redeemable object or an unredeemable object based on the identified object classes of the object, and counting the redeemable objects within the batch.

In some embodiments, the method can further include assigning a value to each counted redeemable object within the batch based on the identified classes of that object; and totaling the value of the counted redeemable objects within the batch based on the value assigned to each object. In further embodiments, the method can include scanning a unique code associated with the batch before capturing the image, wherein the count of redeemable objects is associated with the unique code. In some embodiments, the method can include removing one or more unredeemable objects from the batch of objects before capturing the image.

In other embodiments, the method can further include detecting and identifying one or more boundaries of a first bin, wherein only those objects within the first bin are counted. In some embodiments, each object can be a used beverage container. In some embodiments, the one or more object classes are based on one or more physical characteristics of the objects.

In some embodiments, the value is a monetary value, and the method can further include depositing the total monetary value of the counted redeemable objects into an account associated with the batch. In some embodiments, capturing the image of the batch of objects can further including capturing the image within an enclosure extending over the batch of objects. In such embodiments, capturing the image can further include illuminating the batch of objects. In some embodiments, the method can further include excluding one or more redeemable objects positioned within a predetermined distance of another redeemable object from the count of redeemable objects.

In another representative embodiment, a recycling system is provided. The recycling system can include a cleated conveyor system configured to move a plurality of bins from a first end of the conveyor system to a second end of the conveyor system, each bin being formed by one or more respective cleats of the conveyor system. The recycling system can also include a camera situated and configured to capture an image of a plurality of beverage containers within the bins of the conveyor system and a processor including computer-readable instructions. By executing the instructions, the processor can be configured to detect and identify the beverage containers within an image captured by the camera as belonging to one or more object classes, wherein the object classes determine whether an object is redeemable or unredeemable. By executing the instructions, the process can be further configured to detect and identify within the image captured by the camera the respective cleats of the conveyor system forming a first bin and provide an aggregate count of only those objects within the first bin and identified as redeemable.

The foregoing and other objects, features, and advantages of the invention will become more apparent from the following detailed description, which proceeds with reference to the accompanying figures.

DETAILED DESCRIPTION

General Considerations

Figure 1:
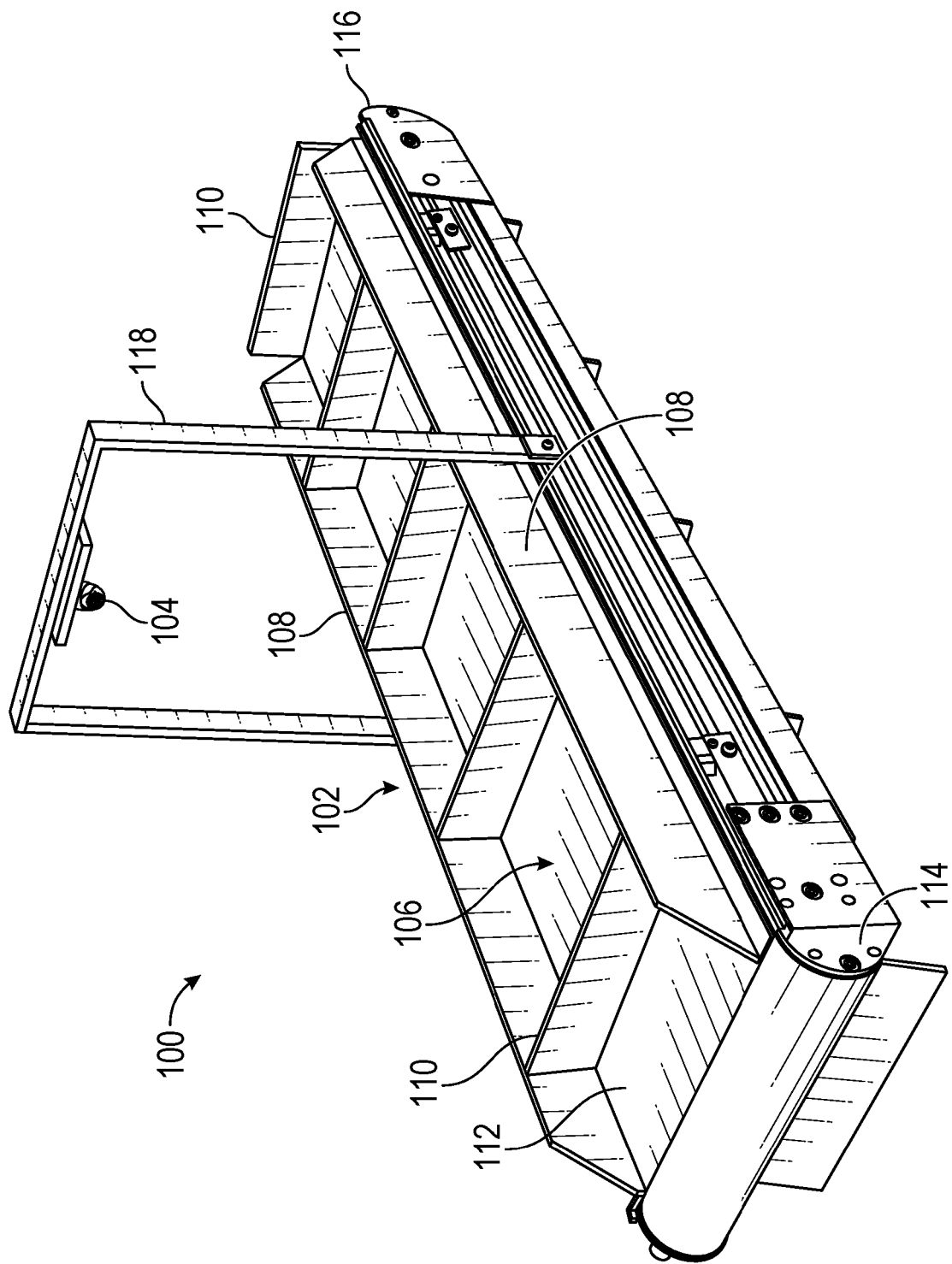
FIG. 1 is a perspective view of a recycling system that can detect, identify, and count redeemable objects.

For purposes of this description, certain aspects, advantages, and novel features of the embodiments of the inventive technology are described herein. The disclosed methods, apparatus, and systems should not be construed as being limiting in any way. Instead, the present disclosure includes lower all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, this manner of description encompasses rearrangement, unless particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this application and in the claims, the singular forms "a," "an," and "the" include the plural forms unless the context clearly dictates otherwise. Additionally, the term "includes" means "comprises." Further, the term "coupled" and "connected" generally mean physically, mechanically, chemically, magnetically, and/or electrically coupled or linked and does not excluded the presence of intermediate elements between the coupled or associated items absent specific contrary language.

As used in this application, the term "and/or" used between the last two of a list of elements means any one or more of the listed elements. For example, the phrase "A, B, and/or C" means "A," "B," "C," "A and B," "A and C," "B and C," or "A, B, and C."

In some examples, values, procedures, or apparatus are referred to as "best," "optimal," "easiest," or the like. Such descriptions are intended to indicate that a selection among many used functional alternatives can be made, and such selections need not be better, easier, smaller, or otherwise preferable to other selections.

For the sake of presentation, the description sometimes uses terms like "provide," "determine," or "use" to describe the disclosed methods, including computer operations in a computing system. These terms are high-level abstractions of the actual operations that are performed. The actual operations that correspond to these terms may vary depending on the particular implementation and are readily discernible by one of ordinary skill in the art.

Recycling System

FIGS. 1-5 show a recycling system 100, which can include a conveyor system 102 and an optical device 104 situated to view the conveyor system 102. The conveyor system 102 can include a plurality of bins 106 arranged successively along its length and configured to receive and retain a variety of redeemable and unredeemable objects (e.g., FIGS. 2 and 3). Each bin 106 can be formed by two side rails 108 extending longitudinally along the conveyor and a series of paddles or cleats 110 extending upwardly from a belt 112 (or other surface) of the conveyor system 102. The cleats 110, in particular, can be perpendicular to the side rails 108 and laterally or axially spaced from one another along the conveyor system 102 to form each bin 106. The belt 112 can generally form a floor or bottom of each bin 106. In some configurations, the bins 106 can alternatively be formed without side rails and/or any number of cleats 110. In other configurations, the bins can be removeable or separable from the conveyor system, e.g., a tote, which can be placed atop and removed from the conveyor system 102.

The conveyor system 102 can include one or more motors or actuators configured to move the belt 112 and bins 106 from a first end 114 of the conveyor system 102 to a second end 116 of the conveyor system 102, and vice versa. In the illustrated example of FIGS. 1-3, during operation, the side rails 108 of the conveyor system 102 can be stationary, while the cleats 110 move with the belt 112 and relative to the side rails 108. As such, each bin 106 can be moved along the conveyor system 102 in a sequential manner, from one end to the other. Movement of the conveyor system 102 can be automated and/or user operated. For instance, the conveyor system 102 can be configured to move upon one or more events occurring, such as once a unique code has been scanned and/or an image of the conveyor system has been captured. In such instances, the conveyor system 102 can be configured to index the bins 106 by a predetermined distance (e.g., by a single bin) and/or include a sensor (not shown) that indicates a next bin is in a desired position. An operator, in some instances, can index the bins 106 via a control panel 120 or other suitable method.

Figure 2:
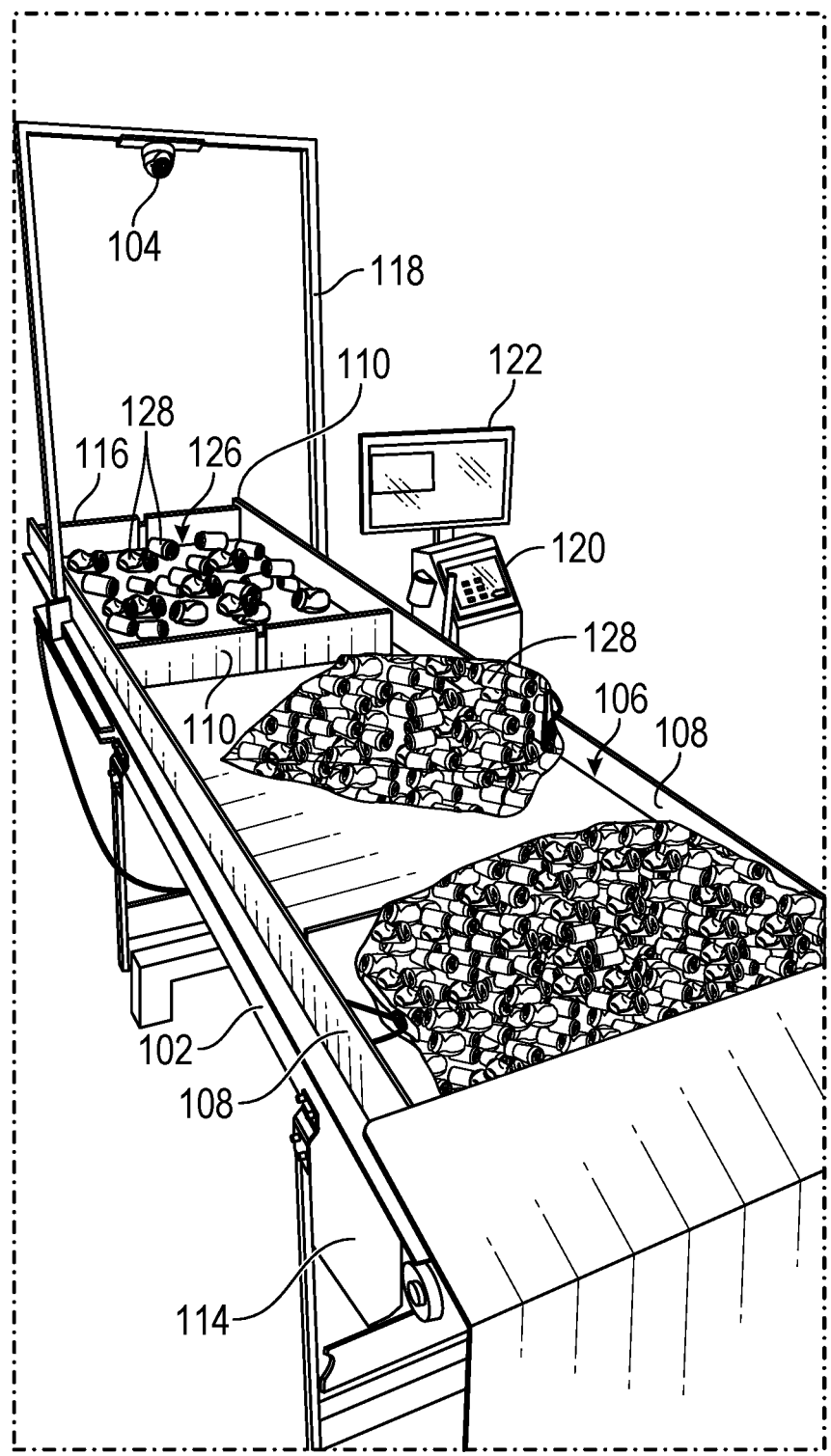
FIG. 2 is a perspective view of the recycling system of FIG. 1 in operation.
Figure 3:
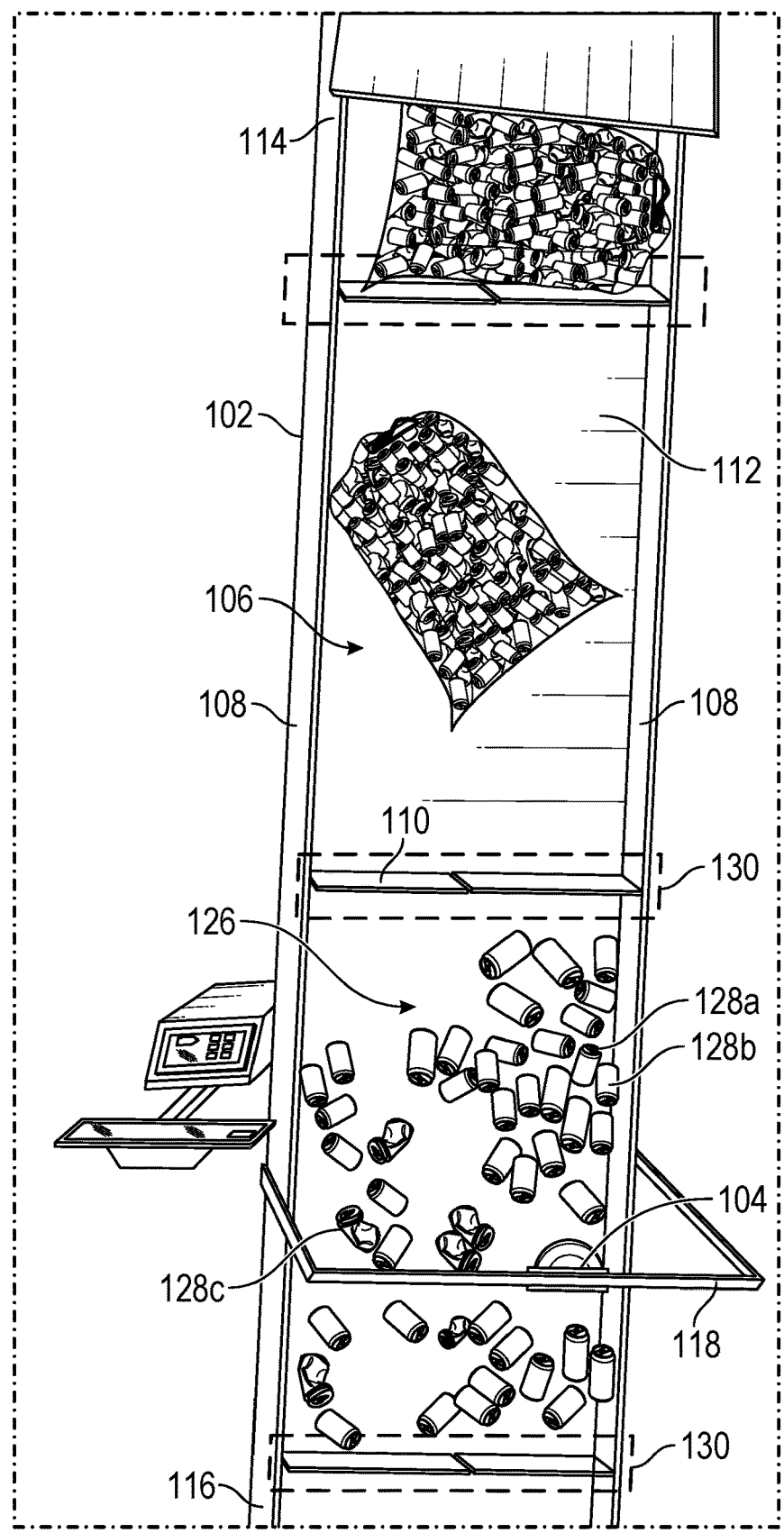
FIG. 3 is a top-down view of the recycling system of FIGS. 1 and 2 in operation.

As shown in FIGS. 1-3, the optical device 104 of the recycling system 100 can be mounted above the conveyor system 102 and bins 106 thereof by way of a support structure 118. The support structure 118 can be coupled to or otherwise situated nearby the conveyor system 102. In this configuration, the optical device 104 can be situated to capture an image of one or more bins 106 along the conveyor system 102 and within its range or field of view. The optical device 104 can be any device that can convert optical signals into electrical signals for image processing, such as a digital camera, in which the resulting images can be used by the computer environment and vision algorithms described herein. In representative examples, the optical device 104 can be an industrial camera designed for machine vision applications.

FIGS. 2 and 3, which depict the recycling system 100 in operation, illustrate that the conveyor system 102 and optical device 104 can be communicatively coupled to a control panel 120. The control panel 120 can be configured to scan or otherwise identify a unique code associated with a batch of redeemable and unredeemable objects for recycling (e.g., via a suitable input device, such as a scanner, keypad, optical device, etc.). The control panel 120 can also be configured to move the conveyor system 102 and the bins 106 thereof such that an operator can position a particular bin of interest within view of the optical device 104. In further examples, the control panel 120 can also signal to the optical device 104 and a computing environment (FIG. 8) of the recycling system 100 to capture an image. A display 122 can also be included and in communication with the optical device 104, such that an operator of the recycling system 100 can observe in real-time the view of the optical device 104. The display 122, in some examples, can also provide a way of viewing an image having recently and/or previously captured by the optical device 104 and provided by a computing environment.

Figure 4:
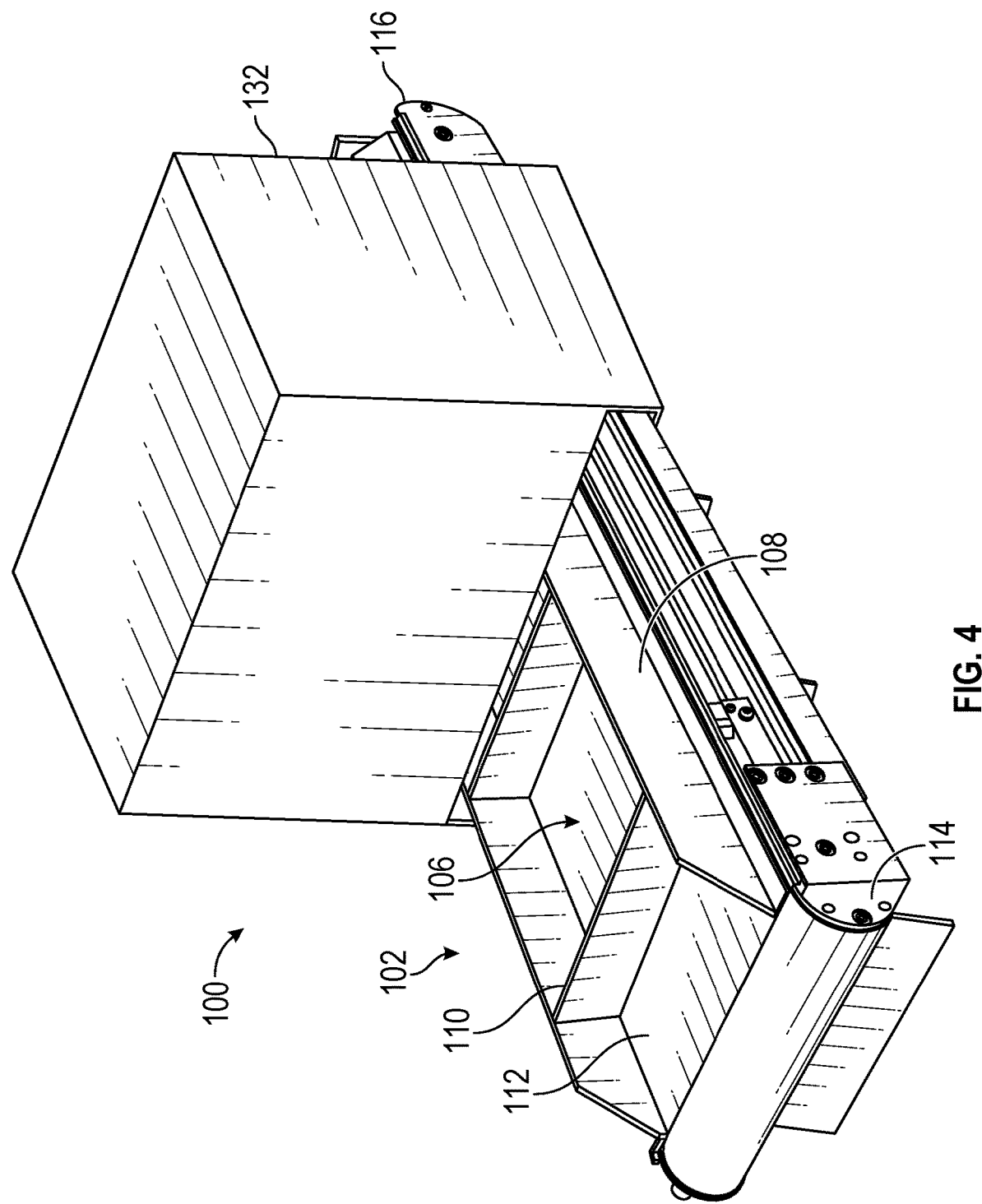
FIG. 4 is a perspective view of the recycling system of FIGS. 1-3, including an enclosure.
Figure 5:
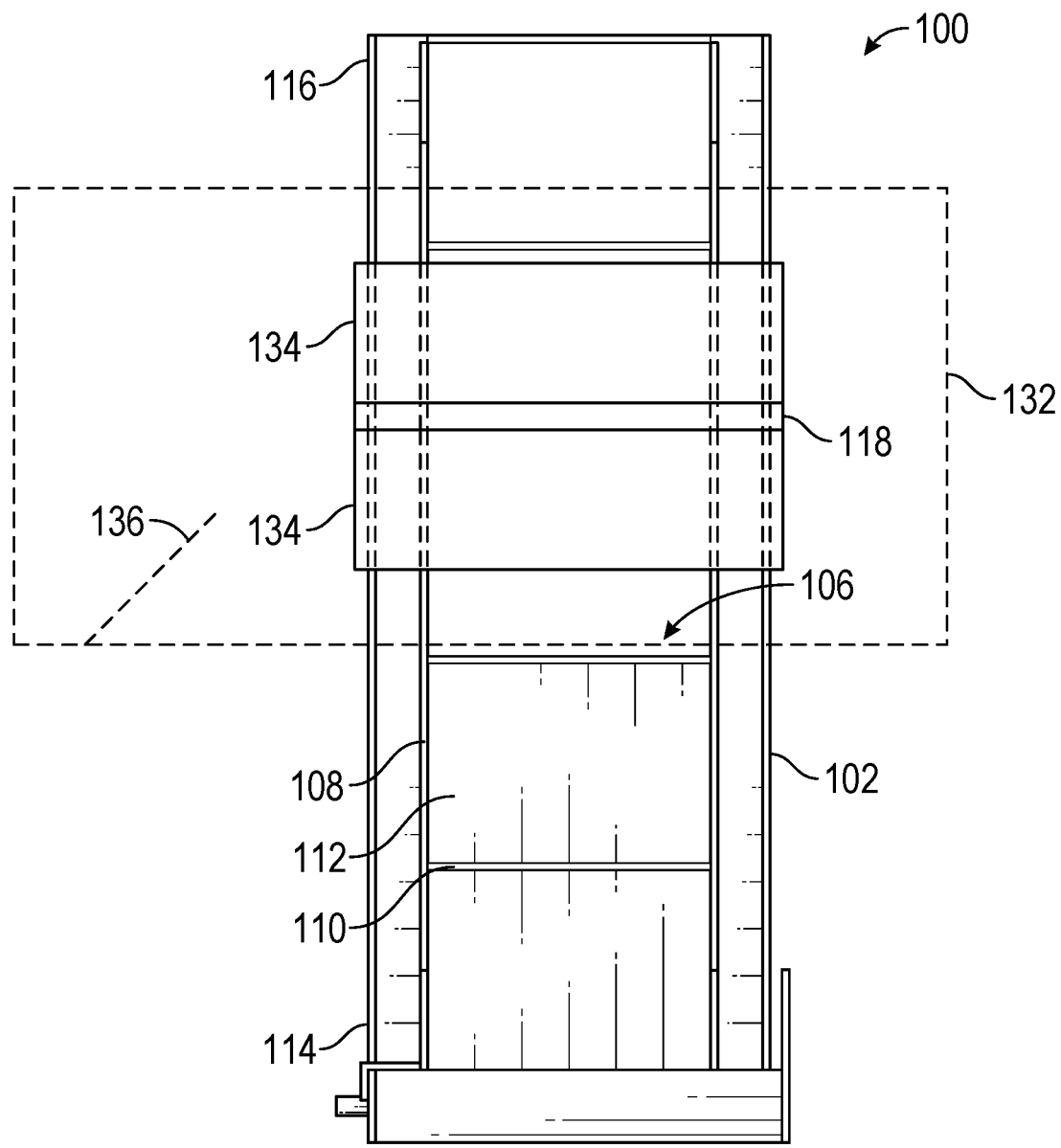
FIG. 5 is a schematic plan view of the recycling system of FIG. 4.

FIGS. 4 and 5 show that the recycling system 100 can, in some instances, also include an enclosure 132. The enclosure 132 can extend over and enclose the optical device 104 and that portion of the conveyor system 102 along which the bin 106 and objects being imaged by the optical device 104 are located. In this way, the enclosure 132 can act as a barrier to block undesired light that may affect the image captured by the optical device 104. Accordingly, as illustrated in FIG. 5, which shows a schematic plan view of the recycling system 100, the enclosure 132 can include one or more lighting systems 134. Each lighting system 134 can include a light source to illuminate the bin 106 and objects therein. When used in conjunction, the lighting system 134 and enclosure 132 can create a controlled environment for capturing an image of the bins 106, such as the overall amount of light. Accordingly, in some examples, the lighting systems 134 can also include one or more light diffusers, such that the light originating from the lighting systems 134 is diffused evenly, or substantially evenly, over the objects within the bin 106 and objects being imaged. As depicted in FIG. 5, in some examples, the enclosure 132 can include a door 136 and have dimensions sufficient to allow an operator to enter the enclosure 132. In some examples, the control panel 120 and/or display 122 can be embedded or otherwise situated along the sidewalls or door 136 of the enclosure 132 for operating the recycling system 100. In other examples, the control panel 120 can be positioned outside or inside the enclosure 132.

Figure 6:
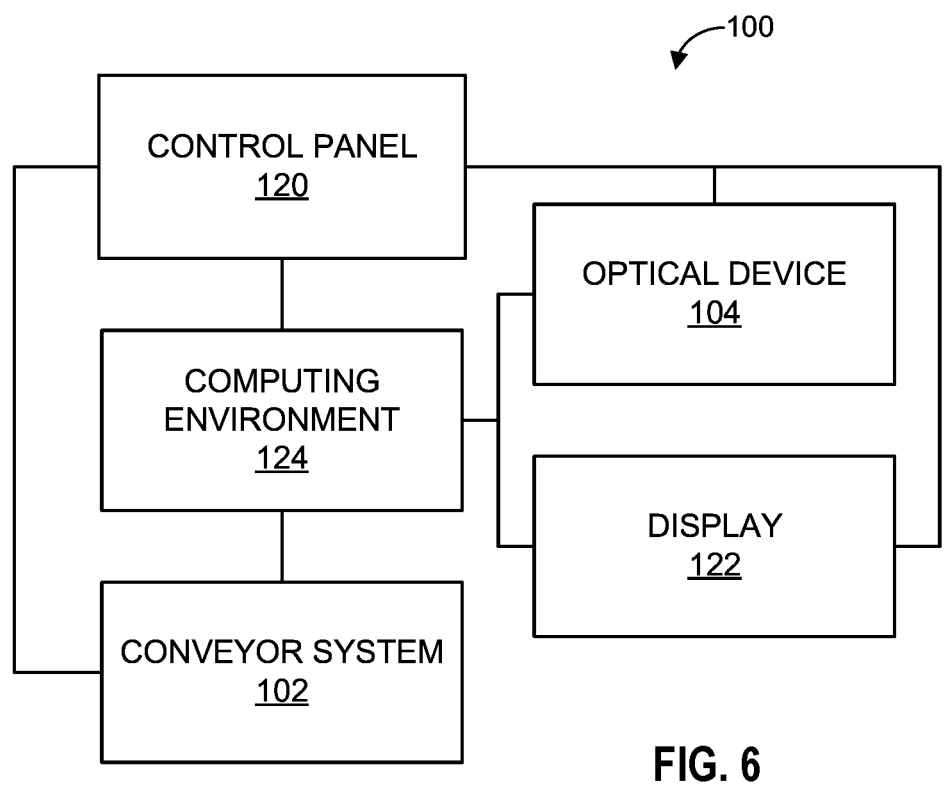
FIG. 6 is a schematic diagram of the recycling systems of FIGS. 1-5, including a computing environment.

As shown in FIG. 6, a representative recycling system 100 can also include a computing environment 124 (FIG. 8) communicatively coupled to the conveyor system 102, optical device 104, control panel 120, and display 122. The computing environment 124 can be configured to implement the methods herein. Specifically, the computing environment 124 can process images captured by the optical device 104 and implement one or more computer vision algorithms for detecting and identifying redeemable objects during batch processing. The computing environment 124 can also provide a mode for determining and assigning value to the redeemable objects identified during the process and crediting accounts associated with processed batches based on those values. In addition to, or in lieu of the control panel 120, the computing environment 124 can also be configured to control the conveyor system 102 and optical device 104 throughout the process, such as in an automated process.

Computer Vision Algorithms and Training

Computer vision algorithms or systems as described herein may be any object detection algorithm, including those employing machine learning, that can be trained to provide improved results or results targeted to the detection and identification of objects. Types of computer vision algorithms can include You Only Look Once (YOLO), Region-Based Convolutional Neural Networks (R-CNN), Fast R-CNN, Mask R-CNN, MobileNet, SqueezeDet, Single Shot MultiBox Defender (SSD), Inception, and any version thereof. Any other computer vision algorithm not derived from the above listed algorithms can also be used.

The computer vision algorithms described herein, can be pre-trained to identify multiple classes of redeemable and unredeemable objects using training data. Training data refers to the input data used to train a computer vision algorithm so that the computer vision algorithm can be used to analyze and detect "unknown" objects within an image, such as a plurality of yet identified redeemable and unredeemable objects. Testing data can also be part of the training data set. The testing data can represent a desired or expected classification which may be compared with the output from the algorithm when the training data inputs are used, and the algorithm may be updated based on the difference between the expected and actual outputs. Generally, each processing of a set of training data through the computer vision algorithm is known as an iteration, episode, or a cycle. Training data can, for example, include data that associates the objects with materials the objects are made from (e.g., aluminum, plastic, or glass), the volumes of the objects, the outer liveries, the brands, the distributors, the cleats of the conveyor system, a geographic region, or any combination thereof.

Batch Processing of Redeemable Objects

Figure 7:
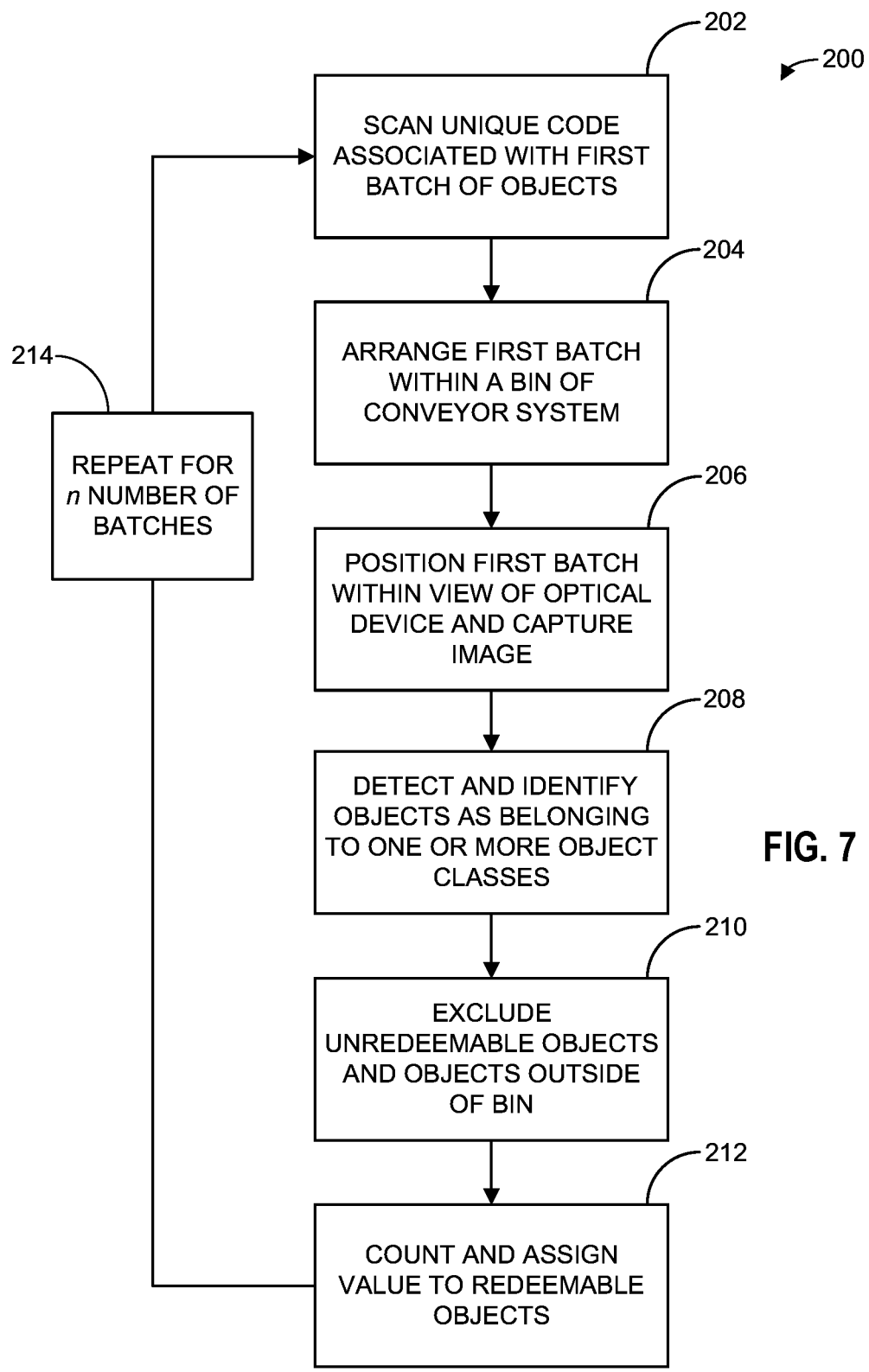
FIG. 7 is a schematic diagram of a representative method.

FIG. 7 is a method 200 for quickly and accurately identifying and counting redeemable objects using a recycling system of the present disclosure. The redeemable objects can be provided in batches (e.g., in bags or totes) via one or more customers and/or account holders which look to exchange the redeemable objects for value, such as a monetary value (e.g., a refund). The value assigned and exchanged can be based on a final aggregate count of the redeemable objects and the identified classes of each of those objects. In many instances, one or more unredeemable objects may be included in a batch. The unredeemable objects can be excluded from the final aggregate count at various steps during the method 200. In representative examples, the redeemable objects are used beverage containers.

At 202, the method can include scanning a unique code associated with a first batch of redeemable objects (e.g., a tag associated with a batch 126 in FIGS. 2 and 3). The unique code can be any unique marking, such as a barcode or Quick Response code ("QR code"), which can be used to associate a final aggregate count of the first batch of objects with an account or log. The account can be a bank account or other account in which a value assigned to the final aggregate count of the redeemable objects can be deposited and/or otherwise accessed. The accounts can be associated with, for example, a specific individual, group, distributor, or retailer which provided the redeemable objects and/or a designated charitable organization. The unique code can be scanned by an operator via a control panel or by other mechanical and optical devices. Scanning the unique code can be an automated process.

At 204, the first batch of redeemable objects can be arranged in a flat, single layered configuration within a bin of a conveyor system such that objects are not stacked atop one another (FIGS. 2 and 3). The redeemable objects can be arranged via an operator and/or an automated process (e.g., mechanical arms or an obstruction that causes the objects to be arranged accordingly). A preliminary inspection of the redeemable objects can be used to separate any unredeemable objects (e.g., object 128c in FIG. 3) from redeemable objects (e.g., objects 128a, 128b in FIG. 3). Unredeemable objects can be, for example, any object or material within the first batch of the objects which are predetermined to be unredeemable for purposes of the final aggregate count, such as trash and objects within an unredeemable class of objects (e.g., wine, refillable bottles, or plastics). Redeemable objects are those objects predetermined to be redeemable and worth some value, such as refundable aluminum cans or certain classes of glass bottles. It should be understood that whether an object is redeemable or unredeemable can be based on a variety of different factors, including physical and spatial characteristics. Also, arranging and/or inspecting the first batch can occur prior to or in conjunction with scanning the unique bar code at 202.

At 206, once the first batch of redeemable objects have been arranged within the bin, the bin can then be positioned within view of an optical device of the recycling system via the conveyor system (FIGS. 2 and 3). The unique code associated with the first batch can, for example, be scanned once the objects have been arranged within the bin to signal to a computing environment of the recycling system to index the conveyor system a preset distance, such as by one bin. In some instances, the conveyor system can also include one or more sensors to identify when to stop the conveyor. An operator of the recycling system can also index the conveyor system as appropriate to bring the first batch and its respective bin within view of the optical device. The operator can control the conveyor system via a control panel (e.g., control panel 120) of the recycling system.

The motion of the conveyor system can also be in such a way as to physically agitate the redeemable objects within the bin to arrange the objects and/or further reduce any object from being stacked, such as those missed during the preliminary inspection or when a preliminary inspection does not occur. The motion of the conveyor system can be an abrupt start and stop, repeated start and stops, a mechanical vibrator included in the conveyor system, and/or other mechanical methods and devices.

Once in range of the optical device, the optical device, such as a camera, captures an image or frame of the first batch of redeemable objects and the bin therein. The image can be produced in a variety of different digital formats for image processing, such as a JPG, PDF, PNG, RAW, or other suitable file formats. In some examples, the image can be a single frame or multiple frames within a sequence of frames, such as within a video image.

At 208, a computer vision algorithm of a computing environment processes the image captured by the optical device. The computer vision algorithm processes the image to detect and identify the objects within the first batch as belonging to one or more classes of redeemable and/or unredeemable objects. Each class of object, for example, can be based on the material of the object (e.g., aluminum, glass, plastic, etc.), the volume of the object (e.g., in units of fluid ounces), the livery of the object, the brand, the producer, the distributor, and/or any other suitable identifying characteristics. In some instances, the geographic region in which the recycling system is located and/or from which an object originates or is manufactured can also be considered. Any single or combination of identified object classes can be determinative of whether a particular object is redeemable or unredeemable. Unredeemable objects, as mentioned, can be an object predetermined to be unredeemable for purposes of the final aggregate count of objects. As an example, the fluid ounce size and livery of an object may indicate the object is a wine bottle which has been predetermined to be unredeemable for purposes of the final aggregate count and thereby, is excluded and not afforded any value.

The computer vision algorithm can also make a series of predictions associated with each redeemable object (or a bounding box predicted for each object). The predictions can include the X,Y coordinates of the object's center, width and height of the object, and a confidence score, which indicates the probability that the object was correctly identified. The confidence score can be, for example, a numerical value ranging from 0 to 1 (or other number, value, or expression). A threshold confidence value, which can be a predetermined threshold value, can be used to exclude any object not meeting the threshold for purposes of the final aggregate count. In some examples, in addition to or in lieu of predicting the center and/or width and height of each object, the computer vision algorithm can also predict the coordinates and dimensions of the four corners of each object and/or the opposing corners of each object. For example, the relative north-west and south-east coordinates of the opposing corners.

The computer vision algorithm can also detect and identify other relevant surrounding objects. Specifically, the computer vision algorithm can also detect the cleats and/or side rails of the conveyor system (e.g., cleats 110 and side rails 108). The computer vision algorithm can, for example, use the top, bottom, left, and right portions of the cleats to define a bounding box to detect and identify the outer boundaries of the bin in which the first batch of redeemable objects is contained. An example of the cleat identification, defining the outer boundaries of the bin, is shown as dashed lines 130 in FIG. 3. In this way, the computer vision algorithm can distinguish between those redeemable objects of the first batch within a its respective bin and those redeemable objects in adjacent bins and/or otherwise located in the surrounding environment outside of the bin (i.e., outside the bounding box). These outer boundaries defined by the identification of the cleats, can be used in post-processing filtering by the computer vision algorithm to exclude those objects outside of the bin from a final aggregate count.

It should be understood that the computer vision algorithm can be configured to identify and predict a variety of different features of redeemable, unredeemable, and/or other surrounding objects. Such features can, for example, include the relative ratios/proportions of the objects, movement of each object, the shape and/or deformity of each object (e.g., a crushed aluminum can), other identifying markings, reflective qualities, etc.

At 210, the computer vision algorithm can perform post-processing filtering steps which are used by the algorithm to distinguish what objects should be counted as redeemable and excluded as unredeemable. In representative examples, for instance, the computer vision algorithm can exclude those objects identified as belonging to an unredeemable class of objects and those objects located outside of the bin containing the first batch via the identified cleats or outer boundaries. As another example, one or more objects within the first batch can be included or excluded in the final aggregate count based on whether the identification of those objects meet the threshold confidence score. As a further example, only one of two or more objects which have overlapping centers or otherwise "too close" to one another (e.g., based on closely related X,Y coordinates) can be counted and the other objects excluded. For instance, one of two or more objects having centers within a predetermined unit distance of one another (e.g., one inch) can be counted, and the remaining objects excluded. This exclusion of overlapping objects can help to prevent false positives from the computer vision algorithm.

After the post-processing filtering, at 212 the computer vision algorithm can provide a final aggregate count of all detected and identified redeemable objects by their identified class or classes to the computing environment. This data can then be used by the computing environment to assign a total value to the first batch and credit the account associated with the batch (e.g., via the unique code). For instance, based on each redeemable object's identified class or classes, each redeemable object is assigned a corresponding value. Each redeemable class can have an equal or different value form any of the other redeemable classes. The assigned value for the redeemable objects is totaled and then credited to the account associated with the first batch. This, and any other data collected during the method 200 can also be accessed later if desired (e.g., for customer service purposes and/or computer vision training data) via the computing environment.

Once the first batch is processed, the redeemable objects can be moved or transported for further processing. Identification and counting of a second batch of redeemable objects can then proceed. The batch processing method can be repeated in a similar manner for any n number of batches at 214. In some examples, the batch processing method 200 can be continuous such that each bin and the redeemable objects therein are in continuous or semi-continuous movement. In such examples, the computer vision algorithm can be configured to detect, identify, and count redeemable objects while in movement and within the flow of the continuous batch processing.

Computing Environment

Figure 8:
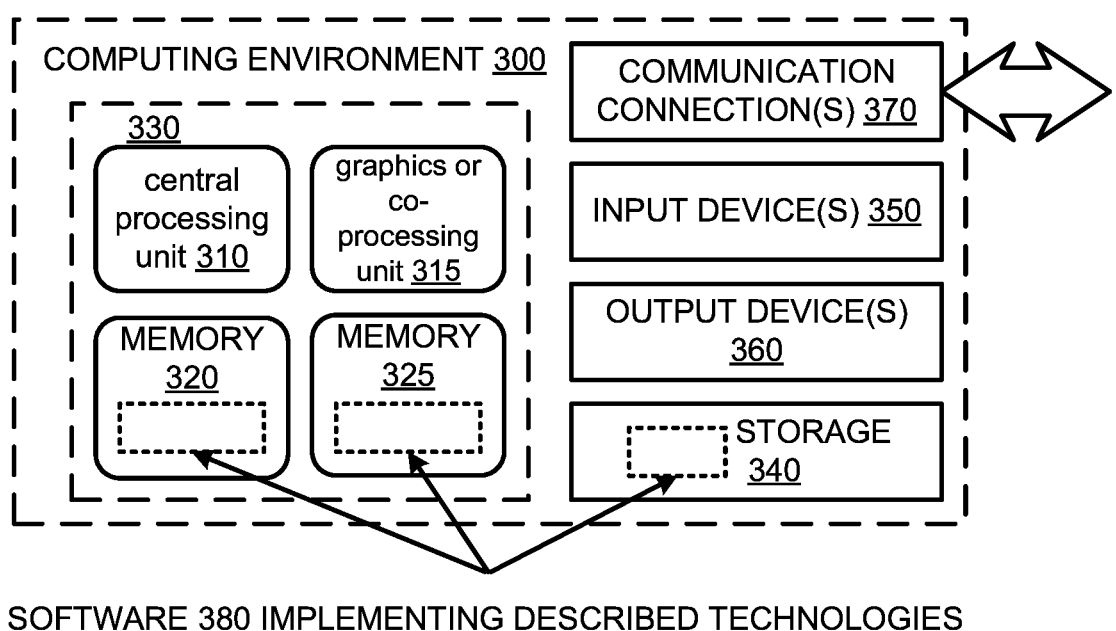
FIG. 8 is a schematic diagram of a representative computing environment for performing the disclosed methods.

FIG. 8 depicts a generalized example of a suitable computing system 300 in which the described innovations can be implemented. The computing system 300 is not intended to suggest any limitation as to scope of use or functionality, as the innovations may be implemented in diverse general-purpose or special-purpose computing systems.

With reference to FIG. 8, the computing system 300 includes one or more processing units 310, 315 and memory 320, 325. In FIG. 8, this configuration 330 is included within the dashed line. The processing units 310, 315 execute computer-readable instructions, such as for implementing the method of FIG. 7 or similar methods thereof. A processing unit can be a general-purpose central processing unit (CPU), processor in an application-specific integrated circuit (ASIC) or any other type of processor. In a multi-processing system, multiple processing units execute computer executable instructions to increase processing power. For example, FIG. 8, shows a central processing unit 310 as well as a graphics processing unit or co-processing unit 315. The tangible memory 320, 325 may be volatile memory (e.g., registers, cache, RAM), non-volatile memory (e.g., ROM, EEPROM, flash memory, solid state drives, etc.), or combination of the two, accessible by the processing unit(s). The memory 320, 325 stores software 380 implementing one or more innovations described herein, in the form of computer-executable instructions suitable for execution by the processing unit(s).

A computing system can have additional features. For example, the computing system 300 includes storage 340, one or more input devices 350, one or more output devices 360, and one or more communication connections 370. An interconnection mechanism (not shown) such as a bus, controller, or network interconnects the components of the computing system 300. Typically, operating system software (not shown) provides an operating environment for other software executing in the computing system 300, and coordinates activities of the components of the computing system 300.

The tangible storage 340 may be removable or non-removable, and includes magnetic disks, magnetic tapes or cassettes, solid state drives, CD-ROMs, DVDs, or any other medium which can be used to store information in a non-transitory way and which can be accessed within the computing system 300. The storage 340 stores instructions for the software 380 implementing one or more innovations described herein.

The input device(s) 350 may be a touch input device such as a keyboard, mouse, pen, or trackball, a voice input device, a scanning device, or another device that provides input to the computing system 300. In representative examples, a control panel or an optical device, such as a industrial camera, can be input devices. For video encoding, the input device(s) 350 may be a camera, video card, TV tuner card, or similar device that accepts video input in analog or digital form, or a CD-ROM or CD-RW that read video samples into the computing system 300. The output device(s) 360 may be a display, printer, speaker, CD-writer, or another device that provides output from the computing system 300.

The communication connection(s) 370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. Moreover, the disclosed technology can be implemented through a variety of computer system configurations, including personal computers, handheld devices, tablets, smart phones, headsets, multiprocessor systems, microprocessor systems, microprocessor-based or programmable consumer electronics, network PCs, minicomputers, mainframe computers, and the like.

In view of the many possible embodiments to which the principles of the disclosed technology may be applied, it should be recognized that the illustrated embodiments are only preferred examples and should not be taken as limiting the scope of the disclosure. I therefore claim all that comes within the scope and spirit of the appended claims.

The invention claimed is:

1. A recycling system comprising:
a conveyor system comprising a plurality of bins, the conveyor system being configured to move the bins from a first end of the conveyor system to a second end of the conveyor system;
an optical device situated and configured to capture an image of a plurality of objects within a respective bin of a plurality of bins of the conveyor system; and
a processor including computer-readable instructions, wherein by executing the instructions, the processor is configured to:
detect and identify the objects within an image captured by the optical device as belonging to one or more object classes, wherein the object classes determine whether an object is redeemable or unredeemable; and
provide a count of only those objects identified as redeemable,
wherein each bin of the plurality of bins comprises an enclosure formed from a pair of raised side rails and a pair of axially-spaced raised cleats.

2. The system of claim 1, wherein by executing the instructions, the processor is further configured to:
detect and identify a first bin, wherein only objects within the first bin are counted.

3. The system of claim 1, wherein by executing the instructions, the processor is further configured to:
predict whether two or more objects identified as redeemable have overlapping centers, wherein only one of the two or more objects having overlapping centers is counted.

4. The system of claim 1, wherein by executing the instructions, the processor is further configured to:
determine a confidence score for each object, wherein only those objects meeting a threshold confidence score are counted.

5. The system of claim 1, wherein the one or more object classes include a material, a volume, a livery, a brand, a geographic region, and/or a distributor of an object.

6. The system of claim 1, wherein the objects are used beverage containers.

7. The system of claim 1, further comprising an enclosure extending over the optical device and the objects, the enclosure having a light source configured to illuminate the objects.

8. The system of claim 7, further comprising a light diffuser configured to diffuse the illumination from the light source over the objects.

9. A method comprising:
capturing an image of a batch of objects within a respective bin of a plurality of bins of a conveyor system, each of the plurality of bins comprising an enclosure formed from a pair of axially-spaced raised cleats and a pair of raised side rails;
detecting and identifying the objects within the image as belonging to one or more object classes;
determining whether each object within the batch is a redeemable object or an unredeemable object based on the identified object classes of the object; and
counting the redeemable objects within the batch.

10. The method of claim 9, further comprising:
assigning a value to each counted redeemable object within the batch based on the identified classes of that object; and
totaling the value of the counted redeemable objects within the batch based on the value assigned to each object.

11. The method of claim 9, further comprising:
scanning a unique code associated with the batch before capturing the image, wherein the count of redeemable objects is associated with the unique code.

12. The method of claim 9, further comprising:
removing one or more unredeemable objects from the batch of objects before capturing the image.

13. The method of claim 9, further comprising:
detecting and identifying one or more boundaries of a first bin, wherein only those objects within the first bin are counted.

14. The method of claim 9, wherein each object is a used beverage container.

15. The method of claim 9, wherein the one or more object classes are based on one or more physical characteristics of the objects.

16. The method of claim 10, wherein the value is a monetary value, the method further comprising:
depositing the total monetary value of the counted redeemable objects into an account associated with the batch.

17. The method of claim 9, wherein capturing the image of the batch of objects further comprises:
capturing the image within an enclosure extending over the batch of objects.

18. The method of claim 9, wherein capturing the image further comprises:
illuminating the batch of objects.

19. The method of claim 9, further comprising:
excluding one or more redeemable objects positioned within a predetermined distance of another redeemable object from the count of redeemable objects.

20. A recycling system comprising:
a cleated conveyor system configured to move a plurality of bins from a first end of the conveyor system to a second end of the conveyor system, wherein each bin is formed by one or more respective cleats of the conveyor system and a pair of adjacent side rails;
a camera situated and configured to capture an image of a plurality of beverage containers within the bins of the conveyor system; and
a processor including computer-readable instructions, wherein by executing the instructions, the processor is configured to:
detect and identify the beverage containers within an image captured by the camera as belonging to one or more object classes, wherein the object classes determine whether an object is redeemable or unredeemable;
detect and identify within the image captured by the camera the respective cleats of the conveyor system forming a first bin; and
provide an aggregate count of only those objects within the first bin and identified as redeemable.

* * * * *